United States Patent [19]

Bishop

[11] Patent Number: 5,012,327
[45] Date of Patent: Apr. 30, 1991

[54] CIRCUIT FOR AND METHOD OF DETECTING A COLOR FIELD SEQUENCE OF A COLOR VIDEO SIGNAL

[75] Inventor: Thomas S. Bishop, Golden, Colo.

[73] Assignee: Ampex Corporation, Redwood City, Calif.

[21] Appl. No.: 242,946

[22] Filed: Sep. 9, 1988

[51] Int. Cl.⁵ .............................................. H04N 9/44
[52] U.S. Cl. ........................................ 358/17; 358/19
[58] Field of Search ................................... 358/17, 19

[56] References Cited

U.S. PATENT DOCUMENTS

4,734,757  3/1988  Akiyama ............................... 358/19
4,788,585  11/1988  Suzuki ................................... 358/10

Primary Examiner—James J. Groody
Assistant Examiner—Robert M. Bauer
Attorney, Agent, or Firm—George B. Almeida; Douglas M. Gilbert

[57] ABSTRACT

A color field 1 detector includes analog and digital processor sections, wherein the analog processor section receives a video signal input and provides the digital signals necessary to drive the digital processor section. A timing generator receives a free-running reference clock and supplies an internal reference signal of subcarrier frequency starting at the falling edge of composite sync. A burst phase comparator compares the incoming color burst phase to the internal reference signal phase and generates logic signals indicative of the phase relationships therebetween to thus indicate whether the color burst is in phase, 180° out of phase, or if any phase error exists. A state machine receives the logic signals and detects the sequence of occurrence of the states of the color burst relative to the internal reference signal. The sequence is indicative of the subcarrier-to-composite sync phase of the video signal input for the particular color television standard. The state machine provides a field reference signal in the form of a selected logic level which identifies the color field 1 of the color field sequence for the standard.

23 Claims, 11 Drawing Sheets

FIG. 5 (NTSC)

FIG. 6 (NTSC)

FIG. 7 (PAL)

CIRCUIT FOR AND METHOD OF DETECTING A COLOR FIELD SEQUENCE OF A COLOR VIDEO SIGNAL

BACKGROUND AND SUMMARY OF THE INVENTION

The invention relates to color field sequence detection and, in particular, to a digital circuit for detecting a specific color field in the color field sequence of a color television signal, for NTSC, PAL or PAL-M color television standards, wherein the usual phase locked loop is eliminated.

In the field of color television, the detection and identification of a specific color field in the color field sequence of an NTSC, PAL, or PAL-M color television standard, is a well known process that is required when performing such processes as color field editing, color framing of videotape recorders, time base correction of color signals, etc. For example, a time base corrector must convert any off-tape field to the field type dictated by the station reference. Likewise, the proper color field must be known when performing an edit process to prevent the generation of undesirable picture shifts.

In turn, color field detection requires the identification of a phase relationship between the color subcarrier signal and the horizontal sync. This relationship for the color fields of the color field sequence in an incoming video reference signal, differs in accordance with the standard.

Because of the television raster scan system of interlace, adjacent fields are offset vertically by one-half scan line. In addition, the color encoding structure is not identical on corresponding lines of different fields. Thus, for example, in NTSC there are two unique color frames each having two interlaced fields. The fields are normally indicated as fields 1 and 2 of color frame A and fields 3 and 4 of color frame B. Fields 1 and 3 differ in that the encoding chroma subcarrier phase will be 180° offset for a given line on field 1 compared to the corresponding line on field 3. The same is true when fields 2 and 4 are compared. In PAL, the sync-to-subcarrier relationship and the V axis phase gives four unique frames (eight unique fields).

Typically, detection of the phase relationship of previous mention is performed in an analog domain by using color burst as a reference to synthesize phase coherent subcarrier, and comparing the latter signal to the edge of horizontal sync during the proper line of each video frame. When the comparison meets the selected specification for subcarrier-to-horizontal sync (ScH) phase, detection of the specified color field, generally color field 1, can be made consistently.

Analog color field sequence detectors presently found, for example, in videotape recorders, editors, etc., require significant analog circuitry. This, in turn, maximizes the susceptibility of the detector to the noise, drift, etc., problems commonly associated with analog circuits. In addition, most of the circuitry must be duplicated for each standard which is handled by the apparatus, thus increasing the components, the complexity, the space required and the costs.

In the analog system, a phase locked loop is employed to continuously re-generate the color subcarrier in a phase locked condition over successive intervals of horizontal lines. The synthesized phase coherent subcarrier then is compared to the edge of horizontal sync during the proper line of each video field. As is well known, phase locked loops are susceptible to the problems of noise, drift, added component count and difficulty in board layout.

The present invention circumvents the disadvantages of the above analog detector circuits while providing the inherent advantages of an all-digital circuit which is fast enough to make the subcarrier-to-sync comparison in the same horizontal line, thereby eliminating the need for a phase locked loop and its inherent disadvantages. To this end, in a preferred embodiment, a reference signal of subcarrier frequency is generated internally, starting with a known phase relationship at the leading edge of H sync. The phase of this reference signal then is compared to incoming burst of the same line when it occurs. Since burst occurs a relatively short time after H-sync, a free-running time base is sufficient to make an accurate phase comparison, and all phase locking circuitry is eliminated.

More particularly, an analog processor section includes a sync stripper and an odd/even field detector to provide composite sync and odd field signals, and a burst processor to provide a squared burst signal. A digital processor section includes a line selector circuit for determining a selected video line signal, and further includes a timing generator responsive to the selected line signal, the composite sync and an NTSC/PAL standard signal for internally generating the reference signal of subcarrier frequency, starting at the leading edge of composite sync. In addition, the timing generator provides a state clock signal, and one or more sample pulses for timing the subsequent phase comparison to be made by a burst phase comparator. The phase comparator also receives the squared burst and, under control of the sample pulses, compares its phase to that of the reference subcarrier signal, whereby the phase relationship may be determined. A state machine circuit receives the phase comparison results and, in response to the standard signal and the state clock, supplies a field reference signal which selectively becomes active to identify the presence of color field 1.

Thus, it may be seen that the reference signal generation, phase detection, sequence detection and timing generation all are performed in the digital domain with its inherent advantages of ease of board layout, lower component count, less board space requirements, adaptability to multiple color television standards and operating stability, as well as the elimination of the phase locked loop as previously mentioned. The invention further lends itself to gate array implementation.

DESCRIPTION OF THE PREFERRED EMBODIMENTS

Figure 1:
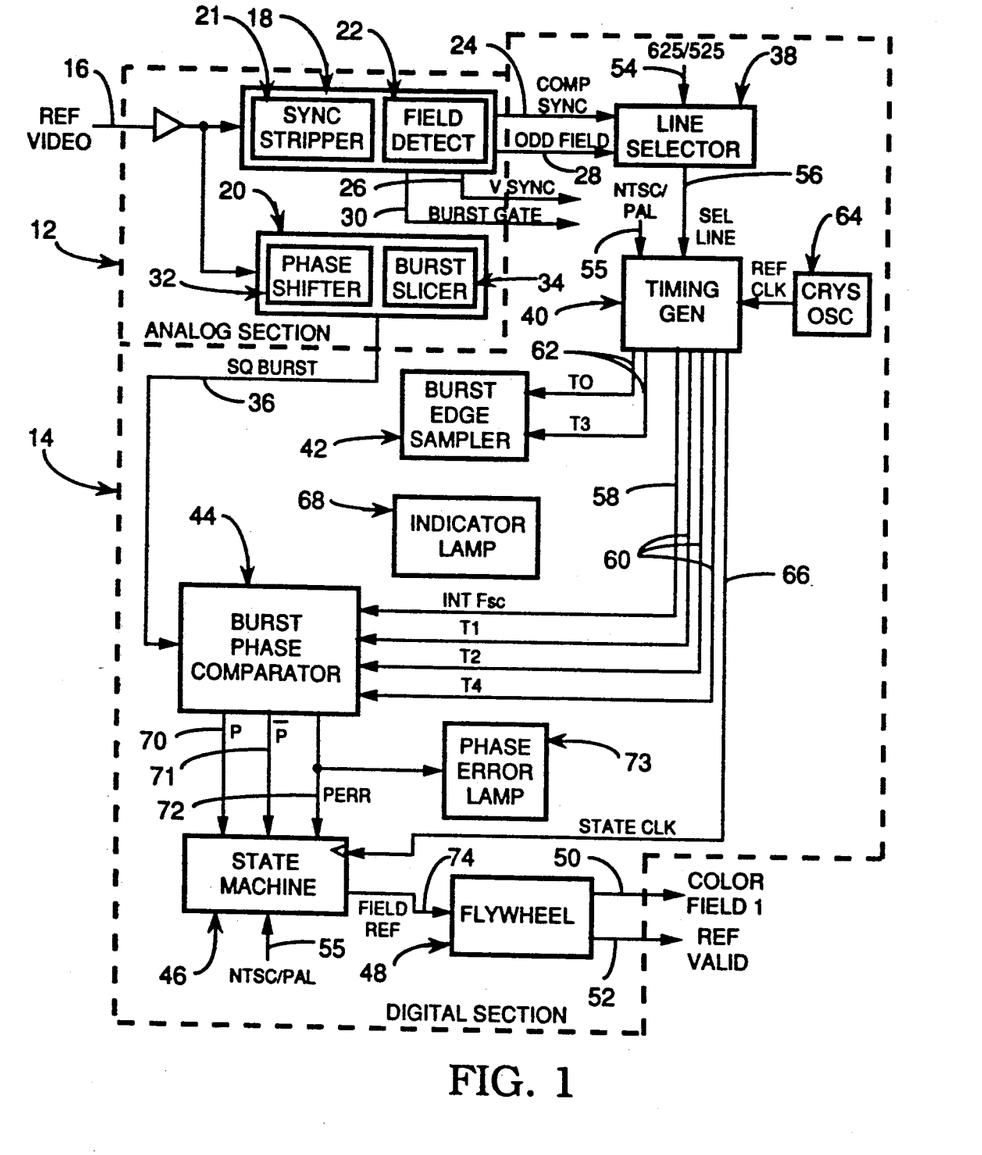
FIG. 1 is a block diagram of an embodiment of the invention combination in its environment.

As depicted in FIG. 1, there are two major sections in the color field 1 detector of description herein. An analog processor section 12 and a digital processor section 14. The analog processor section 12 receives, on a line 16, a reference video signal (REF VIDEO) which may comprise a color bar or black burst signal, or any other suitable reference signal, and provides the necessary digital outputs to drive the digital processor section 14. The heart of the analog processor section 12 is a sync stripper/field detector circuit 18 and a burst processor circuit 20. More particularly, the sync stripper/field detector circuit 18 may include a sync stripper 21 and an even/odd field detector 22. The circuit 18 receives the REF VIDEO signal and provides output signals of composite sync (COMP SYNC) on a line 24, vertical sync (V SYNC) on a line 26, ODD FIELD on a line 28 and BURST GATE on a line 30. It is to be understood that although COMP SYNC is used throughout the description herein when referring to the sync signal, the term "horizontal sync" (H sync) is equally applicable, and may be used instead.

The digital processor section 14 requires an input of a squarewave representation of color burst that can be shifted in phase relative to the input burst. This phase shift is necessary to compensate for propagation delays in the sync stripper/field detector circuit 18 and the following logic circuitry. To this end, the burst processor circuit 20 consists of a burst phase shifter 32 and a burst slicer 34. The burst processor circuit 20 supplies a squared burst signal (SQ BURST) via a line 36 to the digital processor section 14.

The digital processor section 14 comprises essentially six circuits and includes, a line selector circuit 38, a timing generator 40, a burst edge sampler circuit 42, a burst phase comparator 44, a state machine circuit 46 and a flywheel circuit 48. The digital processor section 14 receives three inputs thereto from the analog processor section 12, namely COMP SYNC on line 24, ODD FIELD on line 28 and SQ BURST on line 36, and provides two outputs which comprise the COLOR FIELD 1 signal on a line 50 and a reference valid signal (REF VALID) on a line 52. COLOR FIELD 1 occurs every fourth field for the NTSC color television standard, and every eighth field for the PAL, PAL-M standard. REF VALID indicates whether or not a valid reference signal is present.

The line selector circuit 38 receives COMP SYNC on the line 24 and ODD FIELD on line 28 from the analog processor section 12, and also receives a 625/525 signal on a line 54. Circuit 38 provides a selected video horizontal line number signal (SEL LINE) on a line 56, which herein identifies the video horizontal line 22 for the NTSC color television standard, and the video horizontal line 21 for the PAL and PAL-M standards.

The timing generator 40 receives the SEL LINE signal on the line 56 and a NTSC/PAL signal on a line 55, and provides an internally generated reference signal (INT Fsc) at subcarrier frequency on a line 58. In accordance with the invention, INT Fsc is started at a known phase relationship at the leading edge of horizontal sync (composite sync herein) and has an unknown phase relationship to incoming color burst when it occurs. Generator 40 further generates two sample pulses ($T_0$, $T_3$) for the burst edge sampler circuit 42 on lines 62, and three sample pulses ($T_1$, $T_2$, $T_4$) for the burst phase comparator 44 on lines 60. For each television color standard, there is an 8X Fsc crystal oscillator clock source, herein defined at 64, which supplies the required reference clock (REF CLK) to the timing generator 40. The timing generator circuit 40 also provides a state clock pulse (STATE CLK) on a line 66, which latches the output of the burst phase comparator 44 into the state machine circuit 46, as further described below.

The burst edge sampler circuit 42 is provided to simplify the burst phase adjustment during setup of the color field 1 detector. The input burst phase is correctly adjusted when the edges of burst are coincident with the edges of the internal subcarrier reference, INT Fsc. Since the reference oscillators are free-running this cannot occur exactly in practice, but the averaged positions of the edges can be lined up statistically. The output from the burst edge sampler 42 is supplied to an indicator lamp circuit 68, such as an LED, which is driven brightest whenever the averaged position of burst lines up with the edges of INT Fsc, thus simplifying the phase calibration of the detector during the setup procedure.

The burst phase comparator 44 receives SQ BURST on the line 36, and compares it with INT Fsc supplied on the line 58 from the timing generator 40. As further described below, the burst phase comparator 44 provides three outputs which indicate that the incoming squared burst signal (SQ BURST) is in phase with INT Fsc and thus has a known phase relationship with the incoming composite sync signal, is 180° out of phase $\pm \frac{1}{2}$ the phase window, or is out of the phase window, that is, has an indeterminate phase condition. The indeterminate phase condition is indicated on a line 72 via a phase error signal (PERR) logic level. Lines 70 and 71 provide two logic signals P and −P which, when active, indicate the in phase and 180° out of phase conditions, respectively. The PERR signal also is supplied via the line 72, to a phase error circuit 73 which displays the phase error condition determined by the phase comparator 44. The phase error display circuit 73 includes a lamp, and is used to indicate that the phase sequence is indeterminate.

The state machine circuit 46 receives the P, −P and PERR signals from the burst phase comparator 44 on lines 70, 71, 72, and produces an output signal which identifies the presence of the color field 1. This output signal is a field reference signal (FIELD REF) on a line 74, which becomes active for the selected video horizontal line of the color field 1. FIELD REF is used to insure that the flywheel circuit 48 remains synchronized as long as it receives a valid color field 1 sequence from the state machine circuit 46. In turn, the flywheel circuit 48 produces the actual COLOR FIELD 1 identification pulse on the output line 50, at the beginning of the field. The flywheel circuit 48 is used because the state machine circuit 46 does not provide an output on every color field 1 if the input burst phase is marginal, or if the color field detector circuitry is not properly calibrated.

Figure 2:
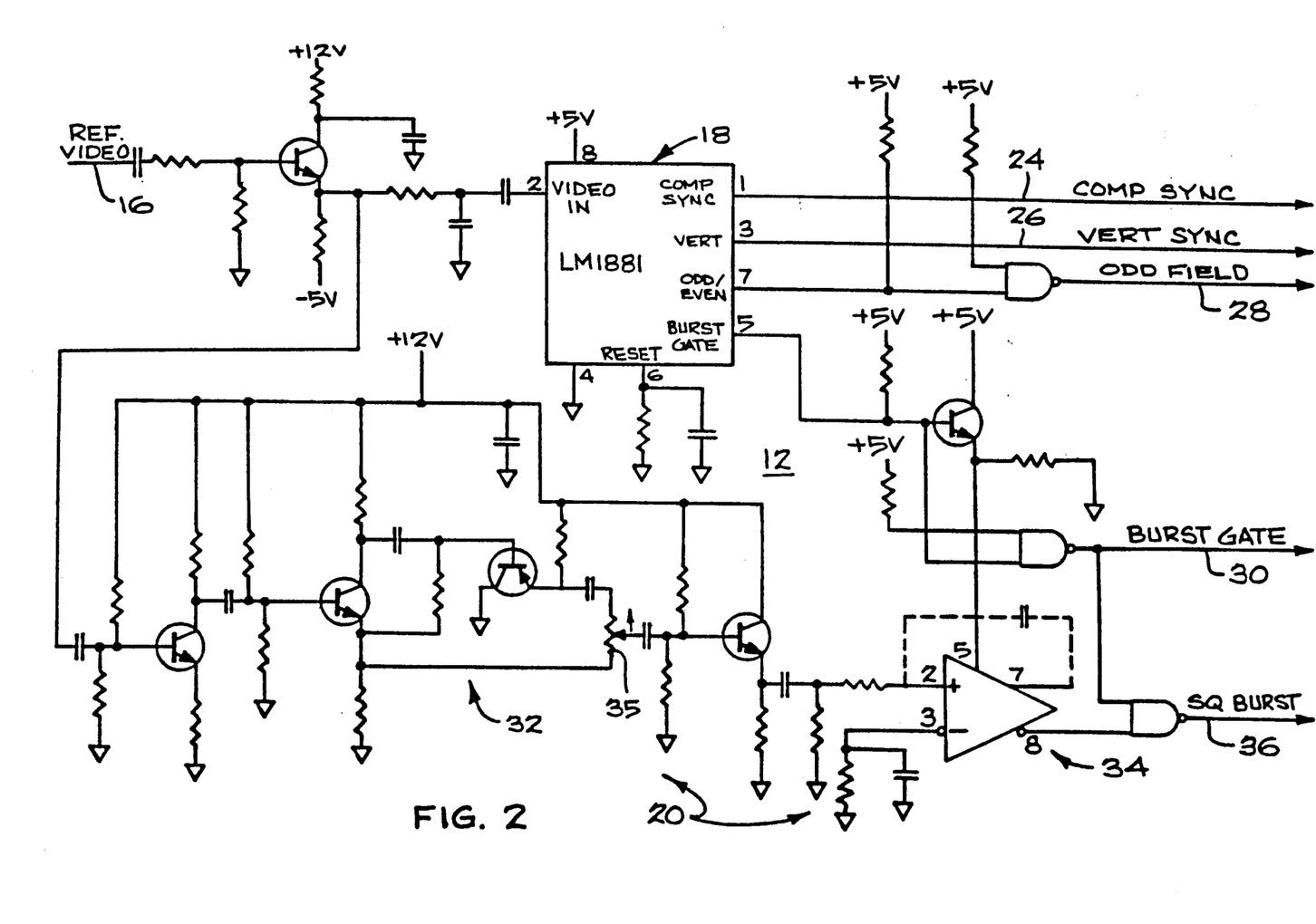
FIG. 2 is a schematic diagram of an implementation of the analog section of the diagram of FIG. 1.

Referring now to FIG. 2, wherein like components are similarly numbered in the Figures, an implementation of the analog processor section 12 is shown in schematic by way of example only, and to illustrate the origin of the primary signals supplied to the digital processor section 14. REF VIDEO is supplied on the line 16 to the sync stripper/field detector 18 as well as to the burst phase shifter 32 of the burst processor circuit 20. The stripper/detector which may be, for example, an LM1881 integrated chip made by National Semiconductor, delivers the COMP SYNC signal on the line 24, the V SYNC signal on the line 26, the ODD FIELD signal on the line 28 and the BURST GATE signal on the line 30. COMP SYNC and ODD FIELD are fed directly to the digital processor section 14. V SYNC and BURST GATE are used elsewhere in the apparatus and are not of specific interest herein.

The burst phase shifter 32 includes four transistors, wherein the first transistor is a high pass filter and gain stage. The next two transistors are phase shift amplifiers. The fourth transistor is a low impedance driver for the burst slicer 34. A variable resistor 35 allows varying the phase shift over a 90 degree range, and is used to adjust the detector circuitry to minimize SQ BURST to INT Fsc phase error, as previously discussed. The burst slicer includes a high speed comparator, whose output is latched except during the burst gate interval. The output of the burst slicer 34 supplies the SQ BURST signal, which is a logic signal representation of burst, on the line 36.

Regarding now the digital processor section 14 of FIGS. 3A through 3H, like components again are similarly numbered in the FIGURES. Thus, in FIG. 3A, the lines 24 and 28 supply the COMP SYNC and ODD FIELD signals, respectively, to the line selector circuit 38. In addition, the line 54 supplies the 625/525 signal to the line selector circuit 38 in the form of a logic level. An inverted COMP SYNC signal is used to clock a pair of counters 80, 81 which begin counting at the start of field 1 of the even/odd pair of fields. To this end, ODD FIELD on line 28 is inverted and clocks a D-type flip-flop 82 whose true output is coupled to the load inputs of the counters 80, 81. The not-true output is coupled to the count enable input of the counter 80. The carry output of the counter 80 is coupled to the count enable input of the counter 81. The minimum outputs of the two counters are coupled to an AND circuit 84 whose output supplies the selected video line number signal (SEL LINE) to the timing generator 40 (FIG. 3D) on the line 56. SEL LINE also clocks a second flip-flop 86 whose not-true output resets the flip-flop 82. Flip-flop 86 is cleared by ODD FIELD. When both counters 80, 81 reach their minimum count, SEL LINE goes high for one video line. At the end of that video line, both counters are stopped and reset. When the 625/525 line 54 is low as in the 625 standard, the output from the counters 80, 81 occurs on video line 22. When the 625/525 line 54 is high as in the 525 standard, the output of the counters occurs on the video line 21. Thus the signal on line 56 identifies the number of the selected video line during which color field 1 is detected, depending upon for the standard being used.

Figure 3A:
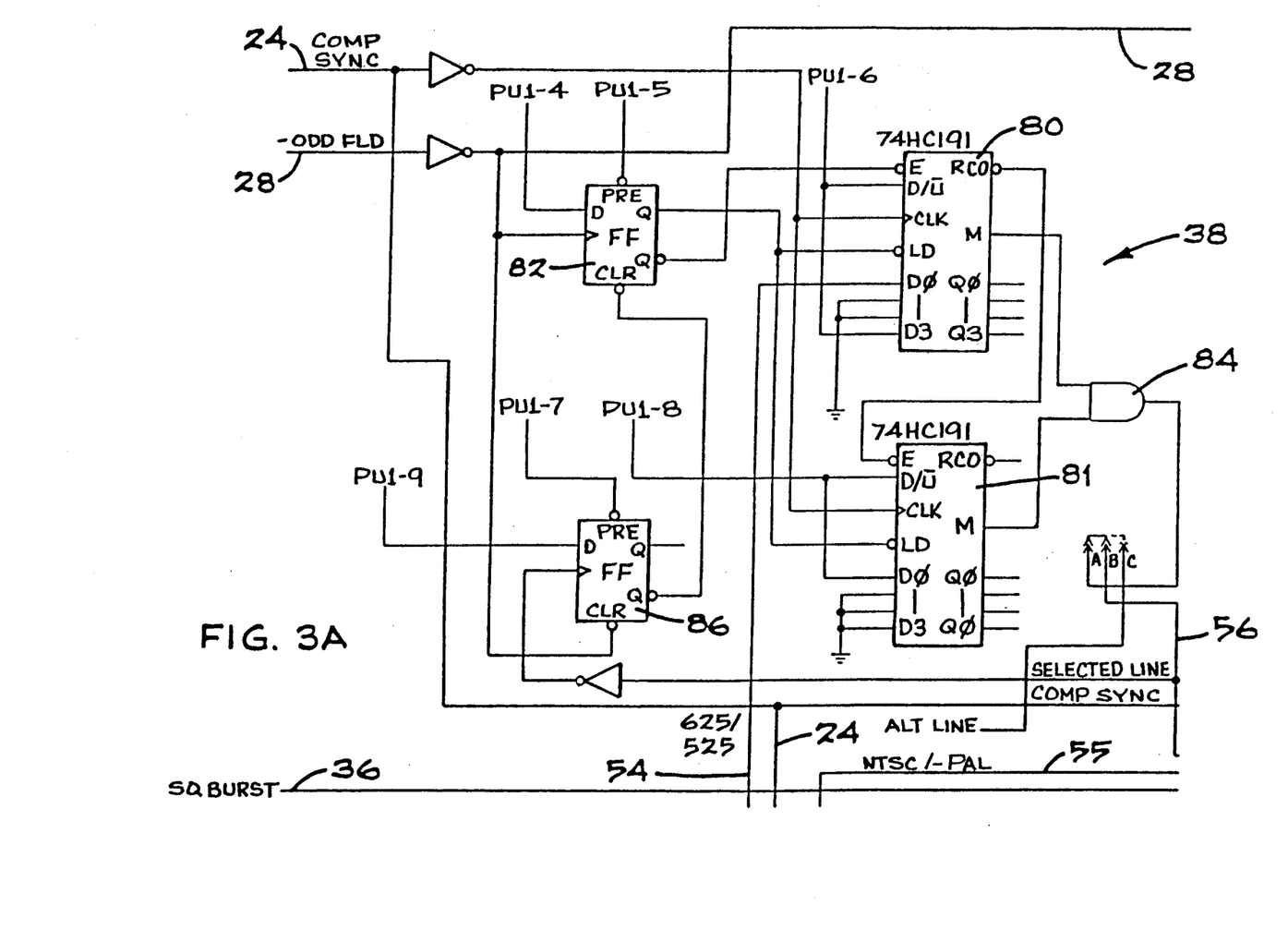
FIGS. 3A-3H are a schematic diagram of an implementation of the digital processor section of the diagram of FIG. 1.
Figure 3B:
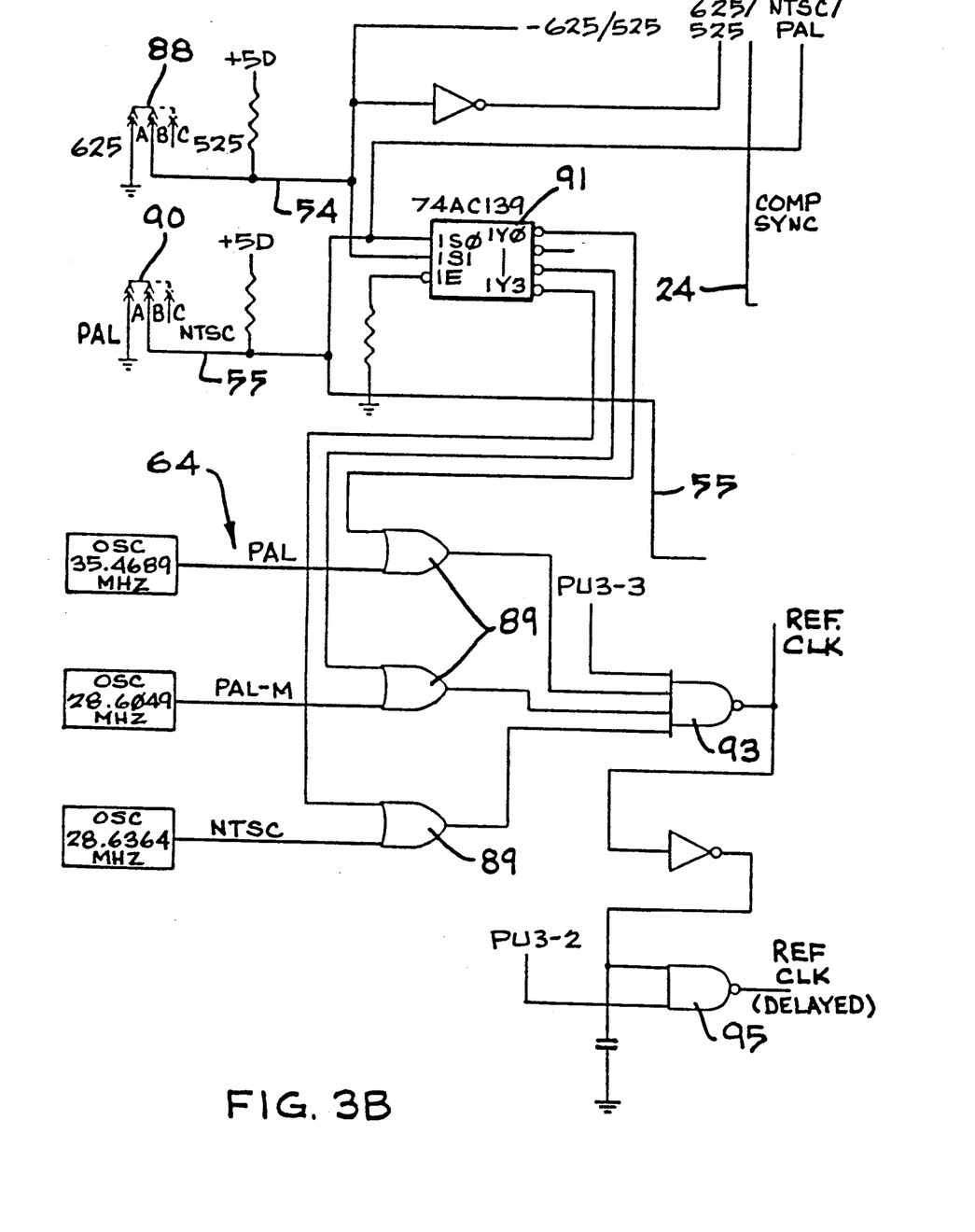

FIG. 3B illustrates an implementation of the crystal oscillator clock source 64 of previous mention by way of example only, and includes herein PAL, PAL-M and NTSC oscillators running at their respective required frequencies. Thus for each television standard, an 8X Fsc reference clock signal is generated. Jumpers 88, 90 are used herein to select the required clock source to be coupled to the timing generator 40. Although three separate crystal oscillators are depicted herein, it is to be understood that they may be replaced by a single oscillator of selected frequency, wherein appropriate circuitry such as dividers may be used to supply the reference clocks for the respective color television standards.

Figure 3C:
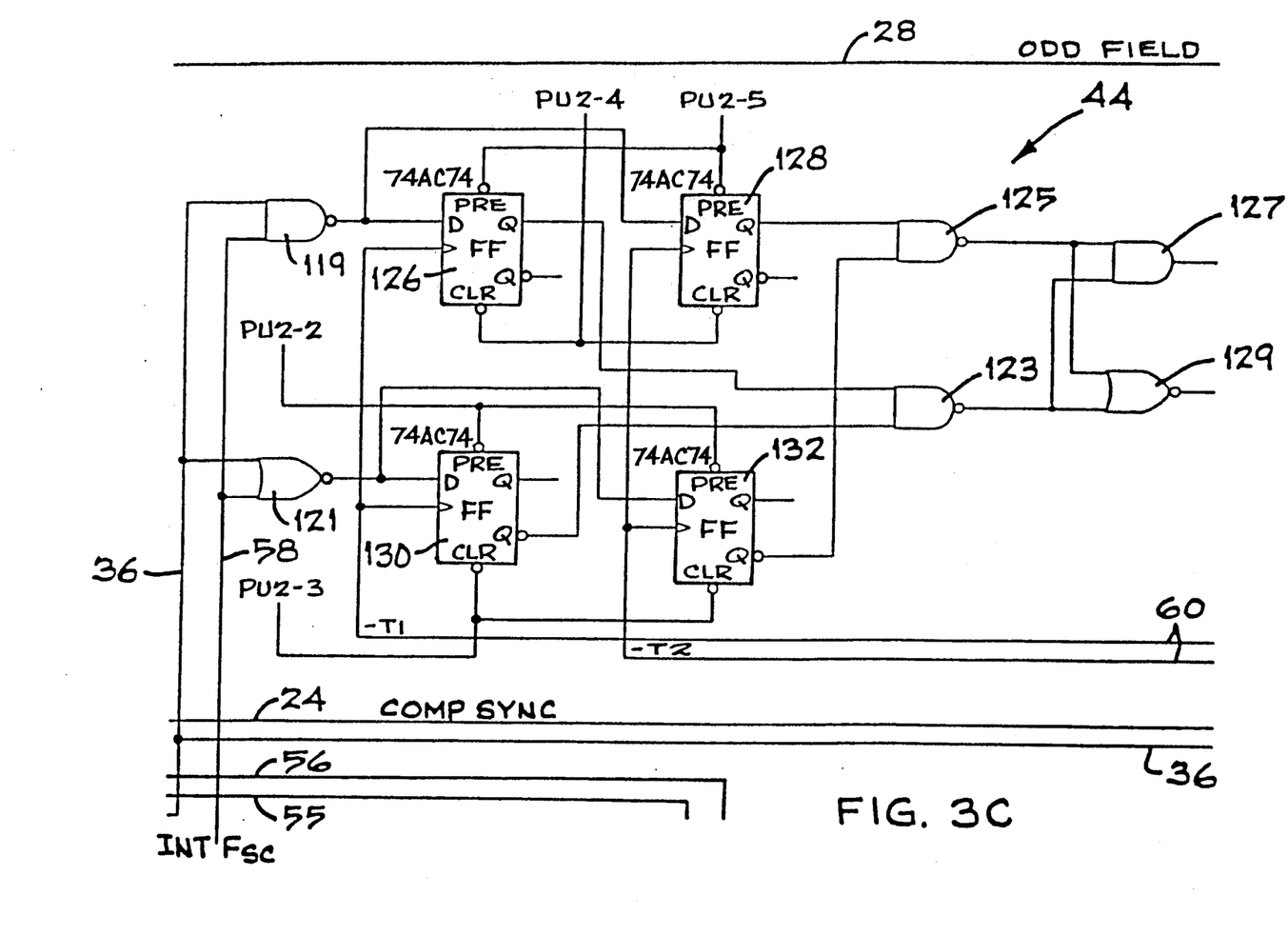
Figure 3D:
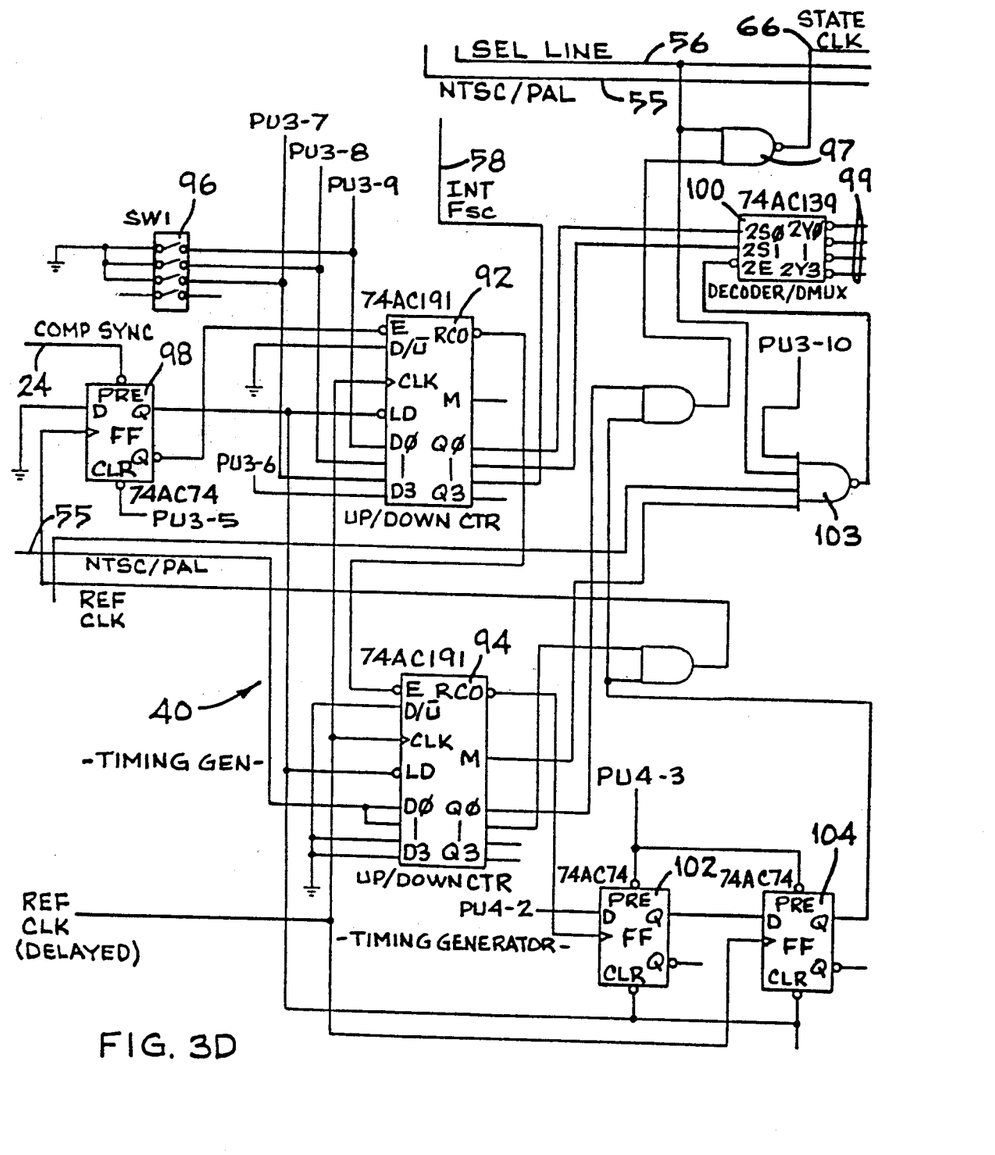
Figure 3E:
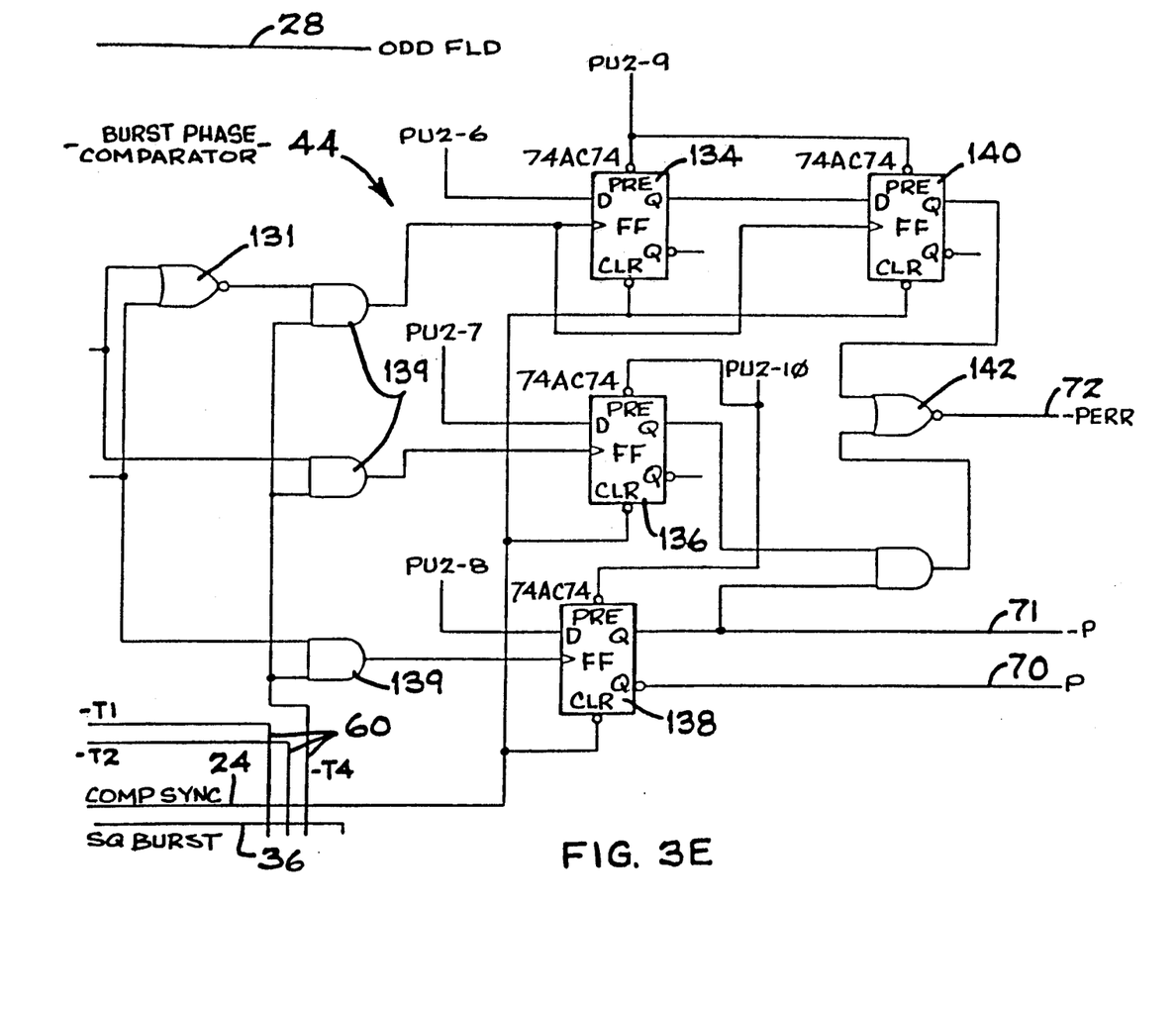
Figure 3F:
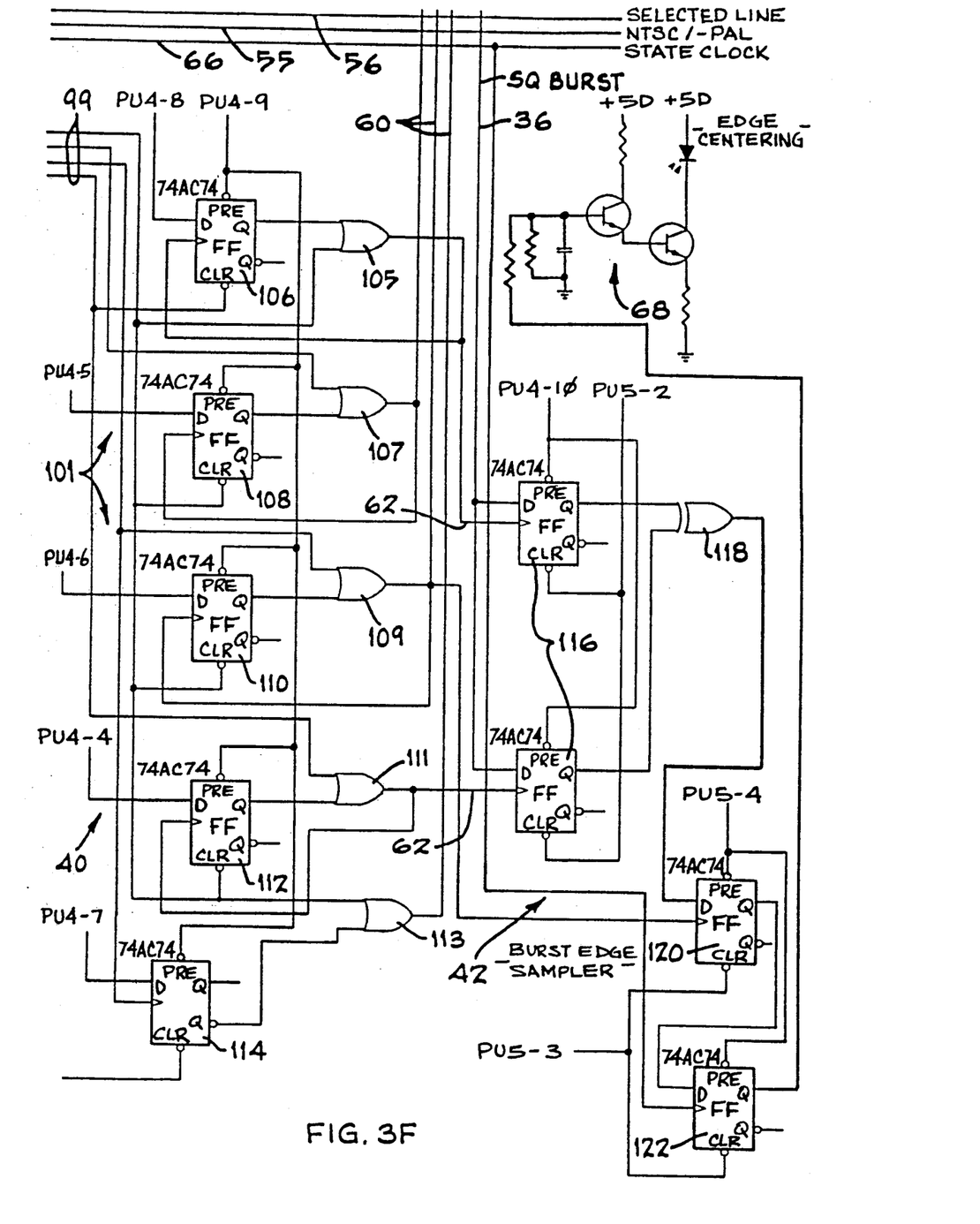
Figure 3G:
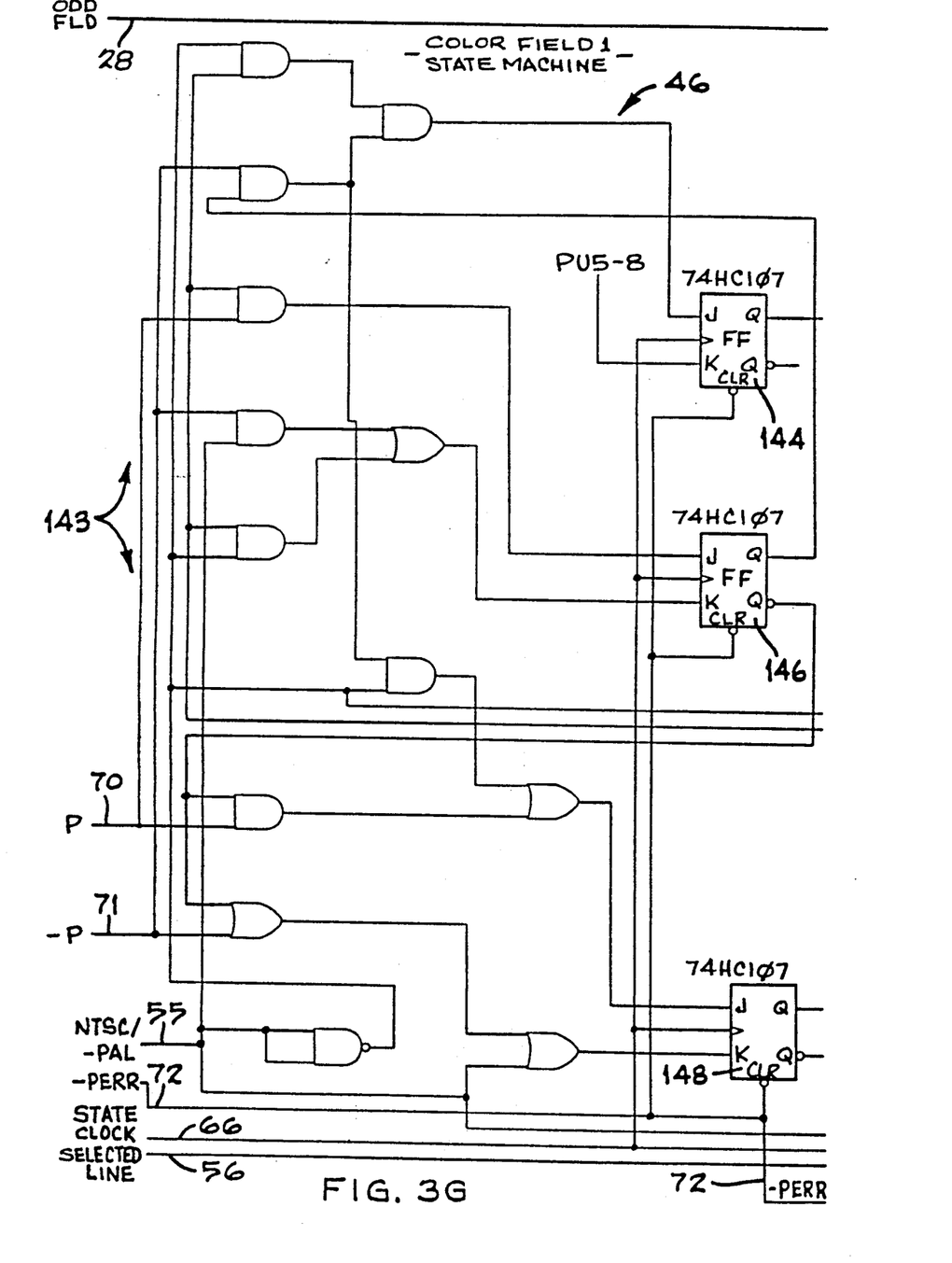
Figure 3H:
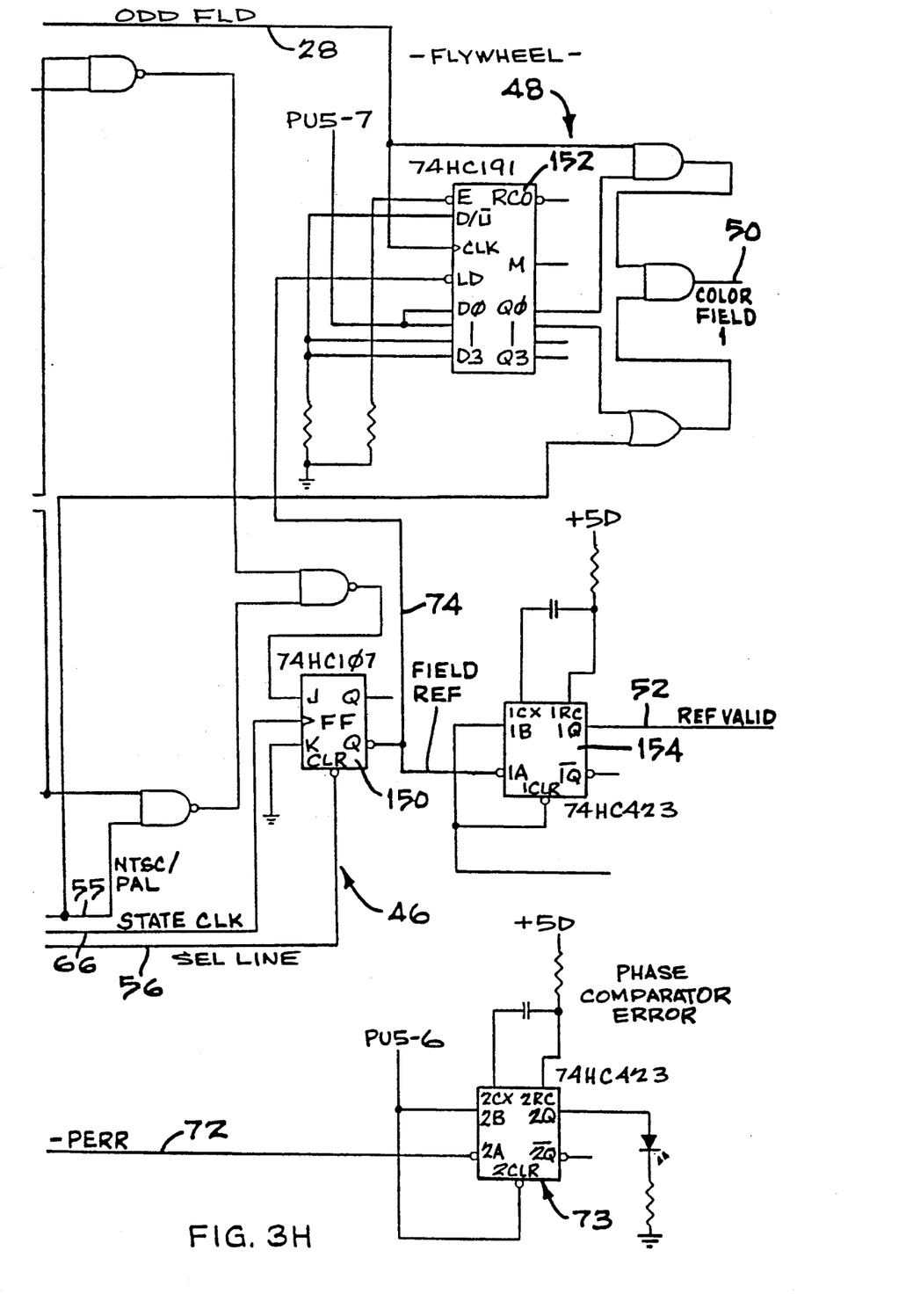

The selected 8X Fsc reference clock signal is supplied to respective OR gates 89, which also receive an input indicative of the NTSC/PAL state from a decoder/demultiplexer 91. A multiple input NAND gate 93 is coupled to OR gates 89 and supplies, via an inverter and a NAND gate 95, the selected REF CLK (slightly delayed) to a pair of four bit up/down counters 92, 94 (FIG. 3D). The counters 92, 94 are pre-loaded with a number that is dependent on a phase comparator position switch 96 and the NTSC/PAL standard. The number is selected so that when the counter 92 is enabled, INT Fsc has a known phase relationship; for example, 0° phase for a NTSC standard, and 135° phase for a PAL standard. The COMP SYNC signal on line 24 is supplied to a preset input of a D-type flip-flop 98, whose true and not-true outputs are coupled respectively to the load and count enable inputs of the counter 92. At the leading edge of COMP SYNC, the counters 92, 94 begin counting the 8X Fsc reference clock. The Q0, Q1 outputs of the counter 92 are coupled to the S0, S1 inputs of a decoder/demultiplexer 100, whereby these two least significant bits supply the inputs for the rest of a sample pulse generating circuit 101 (FIG. 3F). The Q2 output of counter 92 provides the subcarrier frequency reference INT Fsc signal on the line 58 extending to the burst phase comparator 44 (FIGS. 3C,3E). The output Q0 of the counter 94 is coupled to an AND gate, and thence to a NAND gate 97 which also receives the SEL LINE signal via line 56. The NAND gate 97 supplies the STATE CLK signal on the line 66 extending to the state machine circuit 46 (FIGS. 3G,3H). The Q1 output of the counter 94 is coupled to an AND gate and thence to the clock input of the flip-flop 98. The maximum output of the counter 94 is coupled to a multiple input NAND gate 103, and thence to the enable input of the decoder/demultiplexer 100. The NAND gate 103 also receives the 8X Fsc reference clock signal directly from the NAND gate 93 and SEL LINE on line 56. The carry output of counter 92 is coupled to the count enable input of counter 94, and the carry output of the latter clocks a D-type flip-flop 102. The Q output of flip-flop 102 is coupled to the input of a D-type flip-flop 104, whose Q output provides the second input to the AND gates of previous mention. The flip-flop 104 is clocked by REF CLK from the NAND gate 95. The true output of the flip-flop 98 also loads the counter 94 and resets the flip-flops 102, 104.

The decoder/demultiplexer 100 provides four outputs $Y_0$–$Y_3$ which are used via lines 99 and a series of OR gates 105, 107, 109, 111, 113, to selectively clock the sample pulse generating circuit 101 (FIG. 3F), which includes a series of D-type flip-flops or latches 106–114 whose outputs are coupled to the second inputs of respective OR gates 105–113. The $Y_0$ output of the decoder/demultiplexer 100 also is coupled to the reset inputs of the latches 108, 110, 112 and to a second input of the OR gate 113. The $Y_3$ output resets the latch 106, while $Y_2$ clocks the latch 114, whose reset is coupled to the true output of the flip-flop 98. The circuit 101 provides the (inverted) sample pulses $T_0$ through $T_4$ from the timing generator 40 (FIG. 3D,3F) to the burst edge sampler circuit 42 (FIG. 3F) and to the burst phase comparator 44 (FIGS. 3C,3E) via respective lines 62 and 60. As may be seen, the sample pulses $T_1$, $T_2$, $T_4$ are used to clock the burst phase comparator 44, and the sample pulses $T_0$ and $T_3$ are used to clock the burst edge sampler circuit 42.

In the operation of the timing generator 40, at the falling edge of COMP SYNC on the line 24, the counters 92, 94 begin counting the 8X Fsc reference clock. The two least significant bits are supplied to the sample pulse generating circuit 101 formed of the decoder/demultiplexer 100 (FIG. 3D), the latches 106-114 and the OR gates 105-113 (FIG. 3F). When the most significant counter 94 reaches its maximum count and overflows, and SEL LINE on line 56 is true, the sample pulse generating circuit 101 will be enabled once each REF CLK cycle. This produces the series of sample pulses $T_0-T_4$ (FIG. 3F) during a 16 cycle period of the 8X Fsc reference clock, for two cycles of burst. The number that is loaded into the most significant counter 94 (FIG. 3D) is selected to center the sample pulse sequence in the burst interval. Three switches in the phase comparator position switch 96 provide a coarse adjustment of the generated reference INT Fsc phase. For example, incrementing the binary value of the switches advances the initial phase of INT Fsc by 45°. Thus the five sample pulses $T_0-T_4$ are generated at different times each half-cycle of subcarrier for the period of two cycles of subcarrier.

As further described below, it is to be understood that the number of samples taken does not have to be eight samples in two cycles of burst, but can be more or less samples taken in more or less cycles of burst. For example, one sample may be taken at peak voltage of a burst cycle, or two samples may be taken before and after burst zero crossing, etc, as explained further below.

When the most significant counter 94 overflows, the flip-flop 102 is clocked. One clock cycle later, the second flip-flop 104 is set. This effectively adds another bit to the counters. Then 15 clock cycles later, the output Q0 of counter 94 goes high and clocks the state machine 46 via the NAND gate 97. After another 16 clock cycles, the output Q1 goes high which causes the counters to be stopped and reloaded via the flip-flop 98, and flip-flops 102, 104 are cleared.

The burst edge sampler circuit 42 of FIG. 3F facilitates the burst phase adjustment during setup of the color field 1 detector, by providing means to line up the average positions of the edges of burst statistically with the average positions of the edges of INT Fsc. To this end, SQ BURST on line 36 is sampled in D-type latches 116 by the sample pulses $T_O$ and $T_3$ from the timing generator 40. The sample pulse $T_0$ occurs just after every transition of INT Fsc. The sample pulse $T_3$ occurs just before each transition. An exclusive OR gate 118 compares the results. Its output is sampled in a D-type flip-flop or latch 120 at the center of each half cycle of INT Fsc by sample pulse $T_2$. Several samples are taken during the burst sample interval, but to avoid confusion only the last sample is used. This result is latched in a latch 122 by the STATE CLK signal on the line 66. The resulting signal will toggle up and down depending on the position of the burst edge relative to the sample pulses. Whenever the burst edge falls between the sample pulses the output will be high. The output is averaged and supplied to the indicator lamp circuit 68, which is driven brightest whenever the average position of burst lines up with the edges of INT Fsc. This edge alignment technique simplifies the burst phase adjustment process used in the setup of the color field 1 detector, in which the variable resistor 35 of the phase shifter 32 (FIG. 2) provides the adjustment.

Referring to FIG. 3C, the burst phase comparator 44 receives SQ BURST on line 36 at the inputs of two (D-type) latches 126, 128 via a NAND gate 119, and at the inputs of two (D-type) latches 130, 132 via a NOR gate 121. INT Fsc is supplied to the second inputs of gates 119, 121 via the line 58. Latches 126, 130 are clocked by the sample pulse $T_1$, while the latches 128, 132 are clocked by the sample pulse $T_2$. The true and not-true outputs of the latches 126, 130 respectively, are supplied to a NAND gate 123, and those of latches 128, 132 are supplied to a NAND gate 125. The outputs thereof are supplied to three (D-type) latches 134-138 (FIG. 3E) via an array of AND and NOR gates, and three respective AND gates 139. More particularly, in FIGS. 3C,3E, the NAND gates 123, 125 are coupled to a NOR gate 129 and AND gate 127, whose outputs are coupled to a NOR gate 131 and to one input of two of the AND gates 139. The NOR gate 131 output is coupled to the third AND gate 139, whose output clocks the latch 134 and a latch 140. Thus, the latches 134-138 are clocked by the $T_4$ sample pulse via the second inputs of the three respective AND gates 139. Latch 134 is coupled to the latch 140 and thence to a NOR gate 142, while latches 136, 138 are coupled to an AND gate and thence to the NOR gate 142. The latches 134-140 are reset by COMP SYNC.

Timing pulses $T_1$, $T_2$, and $T_4$ occur during half cycles of INT Fsc to detect the phase of SQ BURST. $T_1$ occurs after the zero crossing of INT Fsc and $T_2$ occurs the same period before the next zero crossing. $T_4$ occurs slightly later and is used to latch the result of the comparison into following logic gates. Sets of $T_1$, $T_2$ and $T_4$ pulses occur in four consecutive half-cycles of INT Fsc.

Gates 119 and 121 provide signals which indicate the identical state of SQ BURST and INT Fsc. These values are latched by flip-flop 126 and 130 at time $T_1$, and by flip-flops 128 and 132 at time $T_2$. Gates 123 and 125 supply a signal which shows the in phase condition at $T_1$ and $T_2$, respectively, which is after the zero crossing of a half-cycle of INT Fsc and before the next zero crossing. After sampling the signals at time $T_1$, $T_2$, gates 127 and 129 indicate that the signals were at the same state at both $T_1$ and $T_2$, or that the signals were at different states at both $T_1$ and $T_2$, respectively. This is expected for INT Fsc and SQ BURST signals which are either in phase, or 180° out of phase within the limits of the phase window.

If the same phase is not detected at the time $T_1$ and $T_2$, then gate 131 will output a signal indicating that the phase is out of the sampling window, which will clock flip-flop 134 at time $T_4$. If this out of phase window condition occurs for a second pair of samples, then flip-flop 140 outputs a value which causes gate 142 to activate the PERR signal. If the same phase is detected in one half-cycle, and an opposite phase is detected in another half-cycle, flip-flop 136 is clocked, which activates the PERR signal via gate 142.

If gate 129 is active, which indicates that the signals are 180° out of phase, then flip-flop 138 is clocked, which activates the —P signal and deactivates the P signal. The first occurrence of this will activate the —P signal, because the timing generator is guaranteed to generate four sets of sampling pulses, and invalid samples following this will disqualify this output through assertion of the PERR signal.

For color field detection it is necessary to detect two subcarrier-to-composite sync phase angles which are 180° apart, within a ±45° time window. To this end, it is convenient to provide sampling pulses at plus and minus 67.5° (1½ cycles of 8X Fsc clock) and to center the ±22.5° error from the free-running clock at this point, which provides a window of ±45° for the phase detection. This guarantees that if SQ BURST is within ±45° of generated INT Fsc, then it will be detected as having the same phase. By way of example only, in the description and detector herein, the phase comparison occurs four times during the two consecutive half-cycles of INT Fsc. If the phase is out of the window for two or more of these half-cycles, or if any half-cycles show opposite phase relationships, then the phase indeterminate signal of a selected logic level is generated via the NOR gate 142 on the line 72. Thus PERR, P and −P will indicate that incoming SQ BURST is either out of the phase window, is in phase, or is 180° out of phase with INT Fsc and thus with incoming COMP SYNC on the line 24.

As depicted in FIG. 3H, PERR also is supplied to a monostable multivibrator of the phase error circuit 73, which provides an indication of whether the circuit is detecting the burst to INT Fsc phase relationship properly.

The state machine circuit 46 of FIGS. 3G, 3H receives PERR on line 72, P and −P on lines 70, 71, and the NTSC/PAL input via the line 55, and provides an output which identifies the color field 1. The state machine circuit 46 detects the sequence of occurrence of the SQ BURST to INT Fsc phase relationships supplied by the phase comparator 44, which is indicative of the subcarrier-to-COMP SYNC phase of the incoming signal. To this end, the NTSC/PAL signal and the phase related signals on lines 70, 71, 72, are supplied to a gate array 143 which provides the decision logic which, in turn, supplies commensurate logic signals to multiple JK flip-flops 144–148 (FIG. 3G). The flip-flops are cleared by PERR on line 72, and are clocked by STATE CLK on the line 66. The true outputs of the JK flip-flops 144 and 148 are coupled by NAND gates to the J input of a JK flip-flop 150, which also is clocked by STATE CLK, and which is cleared by SEL LINE on line 56. The true and not-true outputs of flip-flop 146, and the true output of flip-flop 148, are respectively coupled back to the decision logic gate array 143.

Thus, the state machine circuit 44 is a clocked sequential machine which has as an input the result of the phase comparison determined by the burst phase comparator 46. It is clocked once per frame. The output is asserted only after the full color frame sequence of the selected video standard has been detected, and only if the PERR signal has not been asserted during this time. Assertion of PERR causes the machine to be cleared and the sequence detection to begin again.

The sequence to be detected depends on the video standard selected; for instance, the NTSC standard will provide alternating, in phase and out of phase signals with INT Fsc, which indicates that the subcarrier-to-H-sync phase is changing on alternate frames. Color field 1 is thus the frame in which the SQ BURST signal is in phase with the INT Fsc signal, which is always started with a phase angle of zero degrees at the falling edge of H sync.

For the PAL system, the INT Fsc signal is generated with a phase of, for example, 135° at the leading edge of H sync. When measuring the phase of each fourth line from line 9, for example, line 21 in this system, the PAL standard provides a sequence starting at color frame 1 of two in phase frames, followed by two out of phase frames. For example, the P signal should show the repeating sequence 1,1,0,0, which occurs due to the subcarrier-to-H sync phase of color fields 1,3,5,7, respectively.

The output of the state machine circuit 46 is the FIELD REF signal supplied by the JK flip-flop 150 to the flywheel circuit 48 on the line 74 (FIG. 3H). FIELD REF goes to a logic low for most of the selected video line of color field 1. It is used to insure that the flywheel circuit 48 stays synchronized, and to retrigger a monostable multivibrator 154 which provides the REF VALID signal on the line 52. To this end, line 74 is coupled to the load input of an up/down counter 152, and to the input of the monostable 154, which together define the flywheel circuit 48. The counter 152 is in essence a resettable divider, and is clocked by the leading edge of ODD FIELD on the line 28. The least significant bit (Q0) of counter 152 is ANDed with ODD FIELD to insure that the output is only high during field 1 and not during the entire frame. The Q1 output of the counter 152 is ORed with the NTSC/PAL input on line 55. The flywheel circuit 48 supplies the COLOR FIELD 1 signal at the beginning of the field on output line 50 via an AND gate.

The flywheel circuit 48 is used because the state machine circuit 46 will not provide an output on every color field 1 if the input burst phase is marginal, or if the detector system is not calibrated properly. The COLOR FIELD 1 signal only is active during odd fields.

Figure 5:
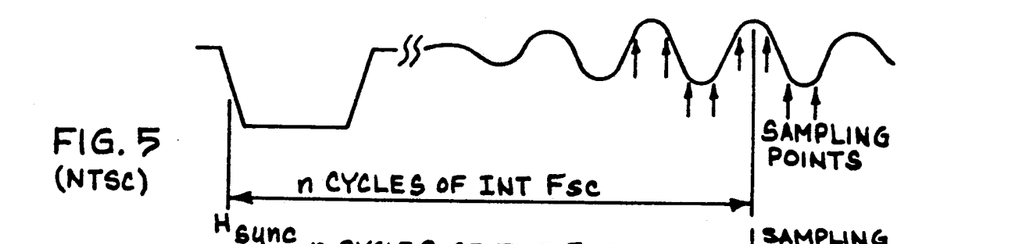
FIGS. 5, 6, 7 are graphs of waveforms illustrating the relationships between H sync and burst phase, and the sample pulses used to sample SQ BURST, for the embodiments of FIGS. 1-3 and 4.

By way of further description, FIG. 5 depicts pictorially the relationship of H sync (that is, COMP SYNC), burst and the multiple sample pulses used in the preferred embodiment, to sample consecutive half-cycles of burst. The method samples burst on either side of a burst peak positive and negative voltage to determine that the phase is correct for the duration of the half-cycle, that is, that the phase difference is inside a window of from zero crossing to the sample point. This embodiment also assumes that the clock frequency is a multiple of the subcarrier frequency, which allows symmetrical phase windows for each half cycle. Thus, the reference INT Fsc is generated at subcarrier frequency with a known phase starting at H sync, whereupon this signal is compared to SQ BURST. The result of the comparison is then analyzed via the logic gates of the state machine circuit 46 to determine the output.

It is to be understood however, that the continuous reference signal INT Fsc may be replaced by generating only the sample pulses (for example, $T_0$–$T_4$) which are used to latch the value of the squared burst signal at the particular sample times. These values then are analyzed directly by commensurate decision logic, to provide the color field information required to detect color field 1.

As previously mentioned, the invention contemplates various modifications to the parameters, components, etc, which are specifically described herein by way of example only. For example, a single sample, two samples, or multiples of samples greater than four samples per cycle of burst, and/or one or more cycles of burst, may be employed to determine the relationship of burst to horizontal sync phase, and thus detect the color field 1 of a color field sequence for the various standards. Thus, in an alternate embodiment, the timing generator 40, the burst phase comparator 44 and the state machine circuit 46 are selectively modified or deleted to provide a single sample pulse from the timing generator 40, which occurs at a time which most readily distinguishes the phase of burst, for example, at the peak of a burst cycle. The phase comparator 44 then may be deleted or modified by changing the decision logic of the gates 123-131 to provide an active logic signal, such as P, when the burst sample reflects one of the selected states of previous mention.

Figure 4:
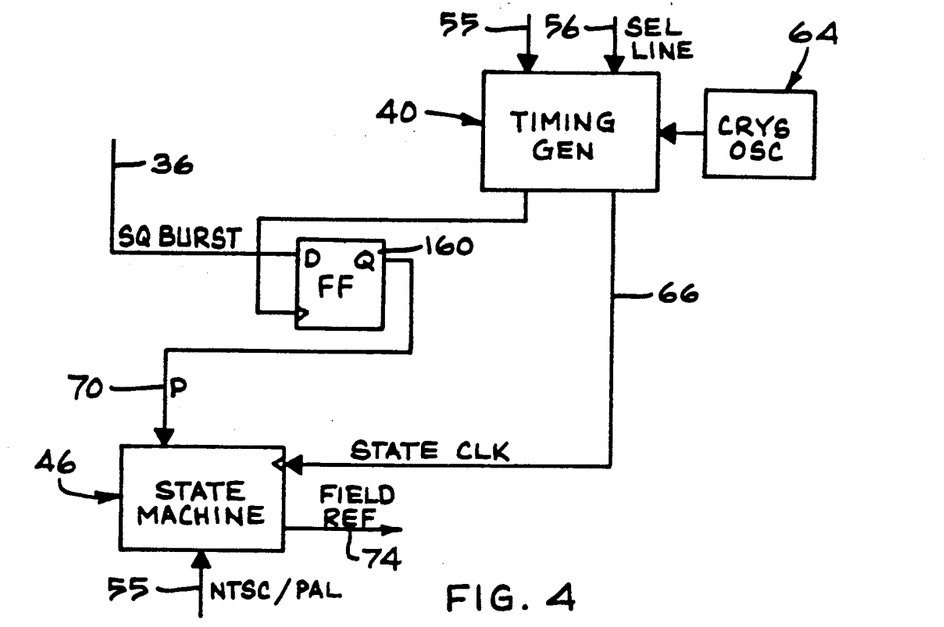
FIG. 4 is a partial block diagram depicting an alternative embodiment of the invention.

To illustrate, FIG. 4 depicts an alternative embodiment of the invention color field 1 detector, wherein a single sample of burst is taken at a selected mid-point thereof. The single sample pulse is used to latch the value of SQ BURST between zero crossings, where burst is expected to be at either maximum or minimum value. A D-type flip-flop 160 may be used to determine the maximum or minimum burst value. The flip-flop 160 then supplies the P signal of previous description, as a logic true or not-true value on the line 70 extending to the state machine circuit 46, which is indicative of the in phase or 180° out of phase relationship. In this embodiment, the burst edge sampler circuit 42 may be used for initial calibration of the timing generator 40, or, as shown in FIG. 4, may be deleted for simplicity. In addition, the state machine circuit 46 may be deleted in a NTSC system, since the squared burst value should be a logical one at the sampling point of n cycles +90° for color field 1, and a logical zero for color field 3. The value of n is selected to delay the sampling point into the middle of the burst period, as previously described.

Figure 6:
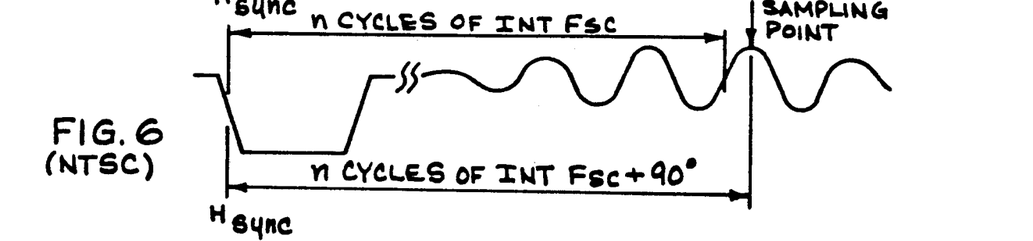

More particularly, FIG. 6 illustrates pictorially the relationship, for the NTSC standard, between the leading edge of H sync (that is, COMP SYNC in FIGS. 1-3), burst and the sampling point of SQ BURST after an interval of n cycles of subcarrier +90°. The expected burst value should be a maximum or a minimum depending upon whether the field is color field 1 or 3.

Figure 7:
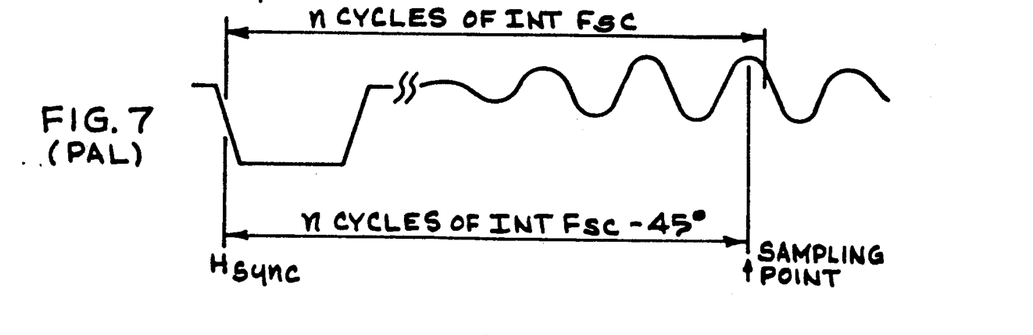

FIG. 7 illustrates the sampling relationships for a single sample system in a PAL standard, wherein the sample pulse is supplied at a sampling point which is n cycles of subcarrier −45° from the leading edge of H sync. In this system, the maximum or minimum value of burst is expected at the sampling point, wherein color fields 1 and 3 have a maximum value when sampled on every fourth line from line 9. Thus, a system which uses only one sample pulse occurring at this time would detect the sequence of 1,1,0,0, sampling on any of the lines 9, 13, 17, 21, etc, starting with color field 1. A sequence detector such as the state machine circuit 46 of previous description is required for this standard.

This general method of sampling the burst at what should be its peak value may be extended to sample several half-cycles of burst, and to then interpret the results. This may improve the reliability of the system.

Likewise, if a pair of burst samples are taken, a pair of sample pulses may be supplied just prior to, and just after, a zero crossing of burst, to allow a comparison of phase with INT Fsc.

What is claimed is:

1. A method for digitally detecting a color field in a color field sequence of a color video signal having a horizontal sync and a color burst which have a given phase relationship with a color subcarrier, comprising:
   determining the location in time of at least one cycle within the color burst of a video line relative to the leading edge of the same video line's horizontal sync;
   supplying at least one sample pulse during said at least one cycle;
   generating in response to said at least one sample pulse at least one selected value within said cycle of the color burst which value is indicative of the phase relationship of the color burst relative to the horizontal sync in the same video line; and
   detecting the sequence of occurrence of successive selected values to determine said color field in the color field sequence.

2. The method of claim 1 wherein the step of determining includes:
   counting clocks of a reference clock signal which is started at the leading edge of horizontal sync and continuing the counting of a preselected number of clocks to define the presence of said at least one cycle within the color burst; and
   said at least one sample pulse being supplied during the peak of said at least one cycle in response to the preselected number of clocks.

3. The method of claim 1 wherein the number of samples taken is at least two, and the step of supplying includes supplying at least two sample pulses, one immediately after and one immediately prior to a zero crossing of the burst cycle.

4. The method of claim 1 wherein a plurality of selected values are generated during said at least one cycle.

5. The method of claim 4 wherein the step of determining further includes:
   providing a reference clock signal at color subcarrier frequency starting at a known phase relationship with the leading edge of the horizontal sync; and
   counting a selected number of clocks of the reference clock signal to determine said location in time of said cycle within the duration of the color burst.

6. The method of claim 4 wherein the step of generating includes:
   supplying a plurality of sample pulses during a plurality of cycles of the color burst;
   sampling the state of the color burst during consecutive cycles of the plurality of cycles in response to the sample pulses; and
   producing state signals indicative of the sampled states of the color burst during the consecutive cycles.

7. The method of claim 6 wherein:
   the step of sampling includes sampling the color burst twice within each half-cycle of each consecutive cycle of color burst to determine if the same state exists for both samples within said each half-cycle; and
   the step of producing includes producing a first logic level to indicate that both samples in a half-cycle are in a similar first state, and an opposite logic level to indicate that both samples in another half-cycle are in a similar opposite state.

8. The method of claim 7 wherein the plurality of color burst cycles are two, and the four consecutive half-cycles are sampled eight times.

9. The method of claim 7 wherein the step of producing further includes producing a phase error signal indicative of the two samples in a half-cycle not being in the same state, thus indicating an indeterminate condition of color burst phase relative to reference clock signal phase.

10. The method of claim 6 wherein the step of detecting includes:
    detecting the sequence of occurrence of the state signals of the consecutive cycles to determine said color field in the color field sequence.

11. A circuit for detecting a color field in a color field sequence of a color video signal having a horizontal sync and a color burst which have a given phase relationship with a color subcarrier, comprising:

means responsive to the horizontal sync for determining the occurrence of a selected cycle within the color burst duration relative to horizontal sync;

means responsive to the determining means for comparing the phase of the color burst with the phase of the previous horizontal sync, and for generating state signals indicative of states of the color burst when it is in phase, or on the order of 180° out of phase; and means responsive to the state signals for detecting the sequence of occurrence of the states to identify said color field in the color field sequence.

12. The circuit of claim 11 wherein the determining means includes:

means for providing an internal reference signal at subcarrier frequency starting with a known phase at a leading edge of the first named horizontal sync; and means receiving the internal reference signal for counting a preselected number of cycles thereof definitive of the occurrence of said selected cycle of color burst.

13. The circuit of claim 12 including:

means for supplying to the determining means a reference clock of preselected frequency commensurate with a given color television standard from which said internal reference signal is provided.

14. The circuit of claim 11 wherein the comparing means includes:

means for producing a plurality of sample pulses during said selected cycle of color burst; and means responsive to the sample pulses for sampling the state of consecutive half-cycles of said selected cycle of color burst.

15. The circuit of claim 11 wherein a selected plurality of color burst cycles are sampled, and wherein said producing means produces a plurality of sample pulses during each color burst cycle.

16. The circuit of claim 15 wherein:

the plurality of color burst cycles is two, and two samples are taken in each consecutive half-cycle of the two cycles; and said last named reponsive means includes means for sensing that the samples in each half-cycle are in the same first state indicative of the color burst being in phase, or in the same opposite state indicative of the color burst being 180° out of phase, or in different states indicative of the color burst having an indeterminate phase condition.

17. A circuit for detecting color field 1 in a color video signal having a horizontal sync and a color burst which have a given phase relationship with a color subcarrier, comprising:

means for generating internally a reference signal at subcarrier frequency starting at a selected phase relationship with a leading edge of said horizontal sync in a selected video line;

means responsive to said generating means for supplying multiple sample pulses during selected cycles of the color burst;

means coupled to the generating means and responsive to the supplying means, for comparing the color burst with the reference signal during said selected cycles, and for providing state signals indicative of the phase relationship between the color burst and the reference signal; and means responsive to the state signals for detecting a sequence of successive selected phase relationships to identify the color field 1.

18. The circuit of claim 17 wherein the generating means includes:

means for producing a reference clock having a frequency commensurate with a given color television standard; and means for counting the reference clock and responsive to the leading edge of horizontal sync to generate said reference signal.

19. The circuit of claim 18 wherein the supplying means includes:

sample pulse generating means responsive to said counting means for supplying a pair of sample pulses during a half-cycle of the selected cycles of the color burst.

20. The circuit of claim 17 wherein the comparing means includes:

latch means responsive to the sample pulses for sampling the state of the color burst relative to the reference signal; and logic means responsive to the state of the color burst for providing the state signals indicative of the states.

21. A circuit for detecting a color field sequence of a color video signal, comprising:

means responsive to the color video signal for producing therefrom an odd field digital signal, and horizontal sync and color burst digital signals which have a selected phase relationship with a color subcarrier;

means for supplying a free-running reference clock having a preselected frequency commensurate with a given color television standard;

means receiving the reference clock and responsive to the horizontal sync for generating an internal reference signal at the color subcarrier frequency starting at a selected phase relationship with a leading edge of the horizontal sync, a state clock signal, and selected sample pulses occurring during corresponding half-cycles of the color burst signal;

means responsive to the selected sample pulses for phase comparing the color burst signal with the internal reference signal to provide selected state signals indicative of phase relationships therebetween; and means receiving the selected state signals and responsive to the state clock signal for detecting the sequence of occurrence of said phase relationships, to identify the color field sequence.

22. The circuit of claim 21 wherein:

the phase comparing means includes means responsive to the selected sample pulses for providing two similar state signals during the half-cycles of color burst signal to indicate an in phase or 180° out of phase relationship; and the detecting means includes means for detecting whether the phase relationship is in phase or 180° out of phase.

23. The circuit of claim 21 including:

means responsive to the horizontal sync and odd field signals for determining a selected video line signal;

counter means responsive to the horizontal sync signal for counting the reference clock and supplying therefrom said state clock signal, said internal reference signal and a pair of logic level signals; and sample pulse generating means receiving said logic level signals and responsive to the selected video line signal and to the counter means to be enabled once each reference clock cycle, for producing the selected sample pulses.

* * * * *